Patented Feb. 6, 1951

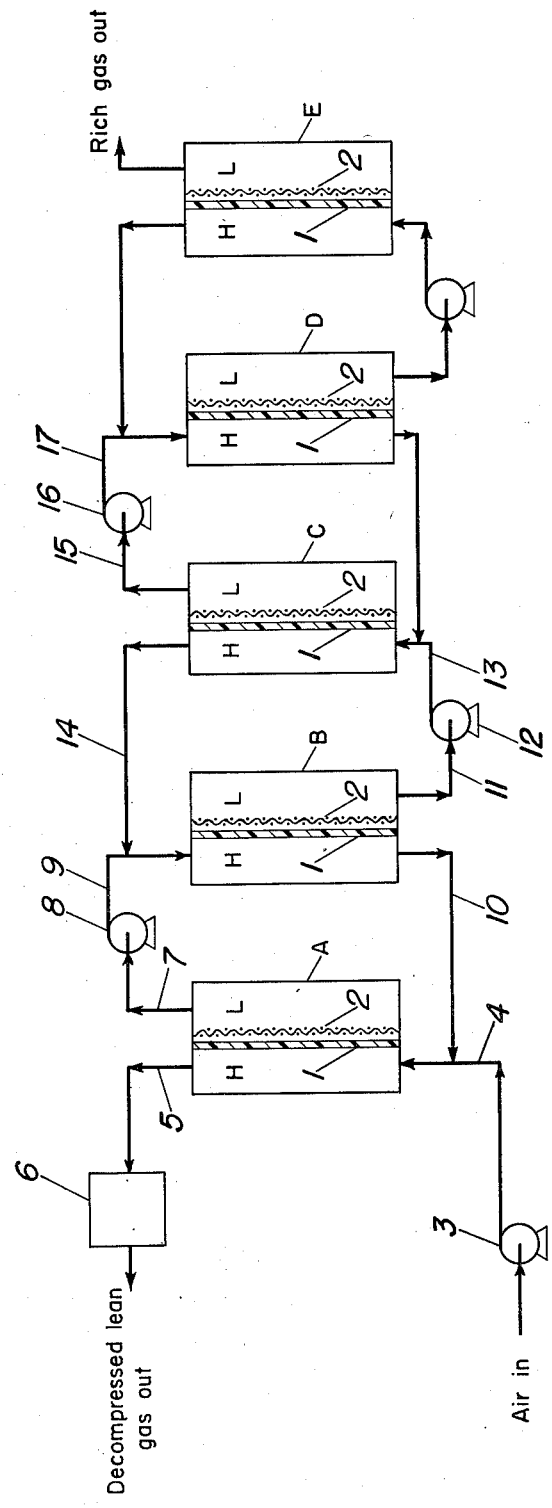

2,540,151

UNITED STATES PATENT OFFICE 2,540,151

SEPARATION OF OXYGEN FROM GAS MIXTURES CONTAINING THE SAME

Sol W. Weller and Waldo A. Steiner, Pittsburgh, Pa., assignors to the United States of America as represented by the Secretary of the Interior Application December 10, 1949, Serial No. 132,346

12 Claims. (Cl. 183—115)

(Granted under the act of March 3, 1883, as amended April 30, 1928; 370 O. G. 757)

The invention herein described and claimed may be manufactured and used by or for the Government of the United States of America for governmental purposes without the payment of royalties thereon or therefor.

This invention relates to a process for the separation of oxygen from gas mixtures containing oxygen. More particularly the invention relates to a process for separating oxygen from atmospheric gases, especially nitrogen, by permeation through a thin, non-porous membrane.

At the present time most commercial processes for the separation of oxygen from air employ the so-called Linde method calling for the low temperature fractionation of liquefied air. Oxygen produced by this process is relatively expensive due largely to the large plant and expensive equipment necessary. It has been suggested that rubber membranes can be used to obtain oxygen-enriched air from atmospheric air by taking advantage of the fact that oxygen permeates through the rubber membrane at a faster rate than most of the other constituents of air. Such a process, however, has never proved commercially feasible for a number of reasons. As is well known, rubber is very susceptible to oxidative deterioration, a feature which makes the use of a rubber membrane especially undesirable in a process where thin sections of rubber would be exposed to high partial pressures of oxygen. Furthermore, the rate of permeation of oxygen as compared to nitrogen through a rubber membrane, that is, the selectivity of the rubber membrane toward oxygen, is not great enough to obtain useable concentrations of oxygen without an excessive number of permeation stages. Each additional permeation stage necessary to obtain a desired concentration of oxygen adds greatly to the cost of the process. A further disadvantage of rubber membranes is the difficulty of preparing them in thin sections having the requisite mechanical stability to withstand handling during installation, and with enough uniformity so as to be free from pin holes and other macroscopic defects which would destroy their selectivity toward oxygen. In a process involving gas separation by permeation through a non-porous membrane, the thickness of the membrane is of great importance since the absolute rate of permeation varies inversely with the membrane thickness.

It is an object of the present invention to eliminate the difficulties concomitant with the use of rubber membranes and to provide a feasible process for the separation of oxygen from atmospheric gases which operates on the principle of selective permeation. In attainment of this and other objects of the invention which will become apparent from the detailed description below, it has been discovered that thin, non-porous membranes comprised of a plastic, film-forming material selected from the group consisting of ethyl cellulose and cellulose propionate are greatly superior to rubber membranes for the separation of oxygen from atmospheric gases, particularly nitrogen. Membranes comprised of these materials are relatively stable toward oxidation even in thin sections. They have a selectivity toward oxygen as compared to nitrogen which is substantially greater than the selectivity of rubber membranes to oxygen, whereby useable concentrations of oxygen may be obtained from air with fewer permeation stages. Whereas rubber membranes are about 2.4 times as permeable to oxygen as to nitrogen, the membranes of the invention are 3.4 or more times as permeable to oxygen as to nitrogen. Membranes of these materials may be prepared in thicknesses as low as .0001 inch without pin holes and if properly supported, may be installed and used under pressure without danger of fracture.

Broadly the process of the invention comprises the steps of bringing air, or any gas mixture comprising oxygen and nitrogen, into contact with one side of a thin, non-porous membrane composed essentially of ethyl cellulose or cellulose propionate, causing a portion of the oxygen-containing gas to permeate through the membrane and removing an oxygen-enriched gas mixture from the opposite side of the membrane.

It is essential that the membranes of the invention be non-porous, that is, be free from pin holes and other defects destroying their continuity. Discontinuities in the membrane large enough to allow gas to leak through rather than permeate through the body of the membrane almost completely destroys the selectivity of the membrane toward oxygen. In this connection, it is to be emphasized that the separation process of the invention does not operate on the same principle as separation of gases by diffusion through porous septa wherein advantage is taken of difference in the rates of diffusion of the component gases through the pore structure. In processes of this nature, the overall rate of diffusion is high but the factor of separation depends on the ratio of the square roots of the molecular weights of the gases to be separated and since the molecular weights of oxygen and nitrogen are close together very little separation of these gases could be achieved in this manner. The process of the present invention entails a relatively slow permeation of the gas mixture through the body of the membrane rather than through pores present therein, and depends on the fact that oxygen permeates through the membrane in this manner at a considerably faster rate than does nitrogen. The presence of pores in the membrane virtually destroys its selectivity by permitting large quantities of substantially unseparated gas to leak through. Although the invention is not to be limited by this theory, it is probable that the selective permeability of the membranes of the invention toward oxygen as compared to nitrogen is due to the greater solubility of oxygen in the membranes and to the faster rate at which the dissolved oxygen permeates through the membrane.

In general, the selectivity of the membrane is independent of the membrane thickness. However, as previously mentioned, the absolute or overall permeability, measured by the total amount of gas which permeates through a membrane of a certain area during a certain period of time is inversely proportional to the thickness of the membrane. Since the rate of permeation of a gas through a solid membrane proceeds rather slowly, the thickness of the membrane must be reduced as much as possible if useable amounts of gas are to be obtained. Membranes of the minimum thickness which may be prepared free from pin holes or other discontinuities, which have sufficient mechanical stability to withstand handling during installation, and which will not rupture under conditions of use should be utilized. Preferably, the membranes of the present invention should be of a thickness in the range of from about 0.0001 to 0.005 inch. In general, films having a thickness less than 0.0001 inch are too fragile for practical purposes. When the thickness of the membrane exceeds 0.005 inch, the absolute or overall rate of permeation becomes quite slow and uneconomical.

In the preferred embodiment of the invention, the process is carried out by continuously flowing a stream of the gas mixture to be separated in contact with one side of the membrane, maintaining a pressure drop across the membrane, allowing a portion of the gas mixture to permeate from the higher to the lower pressure side of the membrane, and continuously removing an oxygen-enriched gas mixture from the lower pressure side.

In order to achieve a separation, it is, of course, essential that only a portion of the mixture to be separated be allowed to permeate. Of a given volume of gas to be separated, the larger the portion that is allowed to permeate in a single permeation stage, the poorer the degree of separation. On the other hand, the smaller the proportion of the mixture brought in contact with the membrane which is allowed to permeate therethrough, the greater the degree of separation. The proportion of gas permeating is conveniently controlled according to the preferred embodiment of the invention by adjusting the rate of flow of the gas stream past the membrane. The faster the rate of flow past the membrane the smaller will be the portion of the gas mixture that will have an opportunity to permeate, and consequently the greater the degree of separation achieved in that permeation stage. A high rate of flow to give the maximum possible separation is not necessarily the optimum rate of flow. The optimum rate will depend upon a large number of cost factors which will be discussed more in detail subsequently.

The provision of a pressure drop across the membrane according to the preferred embodiment of the invention assures the maintenance of a differential in the partial pressures of the gases on either side of the membrane which is a necessary condition if the permeation process is to proceed. Preferably the high pressure side of the membrane is maintained at a pressure well above atmospheric, while the low pressure side is maintained at a lower pressure, most conveniently atmospheric. If desired, however, the pressure on the high pressure side may be atmospheric while a sub-atmospheric pressure is maintained on the low pressure side, or any other arrangement provided whereby a pressure drop is created across the membrane. Since the overall or absolute rate of permeation is directly proportional to the pressure differential on opposite sides of the membrane, and since the selectivity of the membrane improves to some extent the higher the differential, the pressure differential is maintained as high as possible commensurate with the ability of the membranes to resist rupture under pressure and with the cost of compressing the gas mixture.

Instead of, or in addition to, maintaining a pressure drop across the membrane, the enriched gas permeating through the membrane may be swept away by a stream of inert gas, such as steam, which is easily removed as by condensation, and the necessary differential in the partial pressures of the gases on opposite sides of the membrane maintained in this manner. The sweeping gas, however, introduces many difficulties and is preferably not used.

The process of the invention will have its most valuable application in the separation of oxygen from air to provide an oxygen rich gas. In order to economically obtain concentrations of oxygen above about 35%, generally a multi-stage permeation system must be used. The single figure of drawing illustrates such a multi-stage system and for a better understanding of the invention reference is now made thereto.

A five stage permeation process is illustrated, each stage being designated by the letters A, B, C, D, and E, respectively. In its simplest form each stage comprises a chamber divided by a thin, non-porous membrane 1 comprised of ethyl cellulose or cellulose propionate into a high pressure portion H and a low pressure portion L. A perforated support 2 which may be a wire screen or perforated metal sheet, for example, is arranged on the low pressure side of the membrane to prevent its collapse when placed under pressure. A gas mixture, relatively lean in oxygen, such as air, is compressed by means of compressor 3 to a pressure, for example, of 8 atmospheres. The compressed gas is then led into the high pressure side of the first stage and brought in contact with the unsupported side of membrane 1. The opposite side of the membrane is maintained at some lower pressure, most conveniently atmospheric. As the high pressure gas on the unsupported side of the membrane passes through the stage in contact with the membrane, a portion of the gas permeates through the membrane while the remainder passes out at the opposite end of the stage by line 5. The exit gas, which is relatively lean in oxygen as compared to the incoming air is wasted to the atmosphere after first recovering its compressional energy by means of expansion engine 6 or other suitable means for recovering this pressure energy. The portion of gas which has permeated through the membrane is relatively rich in oxygen and this gas is withdrawn from the low pressure side of the stage by line 7, recompressed by means of compressor 8, and delivered to the high pressure side of the second stage B by means of line 9. In the second stage the same process is repeated. A portion of the gas stream flowing past the membrane permeates from the higher to the lower pressure side of the membrane and a portion of the gas, relatively lean in oxygen, leaves the high pressure side of the stage by line 10, and is recycled to the high pressure side of the first stage A. The gas mixture on the low pressure side of the membrane in stage B, now further enriched in oxygen, is withdrawn therefrom by line 11, recompressed by compressor 12, and recirculated to the high pressure side of stage C by line 13. High pressure gas from stage C is withdrawn by line 14 and recycled to the high pressure side of stage B. Oxygen-enriched gas from the low pressure side of stage C is withdrawn by means of line 15, recompressed by compressor 16 and fed to the high pressure side of stage D by line 17. The very same process is repeated in stages D and E, the lean gas from the high pressure side of each stage being recycled to the high pressure side of the last preceding stage, while the oxygen-enriched gas from the low pressure side of each stage is compressed and recirculated to the high pressure side of the next succeeding stage for further enrichment. Any desired number of stages may be employed but five stages is sufficient to give high separations beginning with atmospheric air.

In order to obtain relatively high rates of permeation through the membranes a high pressure differential should be maintained between the high and low pressure side of the membrane. It is preferred to operate with pressures on the high pressure side of at least 4 atmospheres and as high as 30 atmospheres. Most conveniently the low pressure side of the membrane is maintained at atmospheric pressure. The higher the pressure differential, the greater the rate of permeation, and thus the smaller the membrane area required to produce a given quantity of oxygen-enriched gas in a given time. Higher pressures, however, mean higher compression costs. The optimum pressure will always depend on striking a balance between the cost of increased membrane area and the cost of increasing the operating pressure. The rupture point of the membrane employed will determine the upper limit of the pressure differential that may be employed with a given membrane.

The rate of flow of the gas mixture on high pressure side of the membrane will, to some extent, be determined by the degree of separation it is wished to obtain in a single stage of permeation. As previously pointed out, high rates of flow reduce the fraction of gas which permeates and lead to higher degrees of separation in a single stage. The higher the rate of flow, however, the more energy must be expended to compress the gas mixture which flows past the membrane. Since only a portion of this pressure energy contained in the fraction which does not permeate can be recovered, there will always be a point where higher rates of flow to obtain better separations will be uneconomical in view of the high expenditure of unrecoverable pressure energy. Low rates of flow on the other hand allow a greater proportion of the gas to permeate and consequently give poorer separations in a single stage, and therefore a greater number of stages is required to provide the same concentration of oxygen. The optimum rate of flow of gas mixture past the membrane will always lie in a medium range and will depend upon striking a balance between the cost of compressing additional gas and the cost of additional permeation stages.

In the process of the invention, the optimum rate of flow under most conditions will be of a low order of magnitude due to the relatively low rate at which a gas mixture permeates through solid membranes. In the preferred operation of the process, the rate of flow will be of such an order of magnitude that the flow will be laminar rather than turbulent, and will be characterized by a Reynolds number in the range of from 0.01 to 100.

*Example*

The following example illustrates the production of an oxygen-enriched gas mixture starting with atmospheric air and employing five stages of permeation. An ethyl cellulose membrane 0.001 inch thickness is used in each stage supported on the low pressure side by a perforated metal sheet or a wire screen. The selectivity of the ethyl cellulose membrane employed, as measured by the ratio of its absolute permeability to oxygen to its absolute permeability to nitrogen, is 3.4. The gas on the high pressure side in each stage is maintained at 8 atmospheres while the low pressure side is maintained at 1 atmosphere. In the first stage the rate of flow of air (containing 20.9% oxygen) on the high pressure side is adjusted so that about 50% of the ingoing air permeates to the opposite side of the membrane, and about 50% of the ingoing air passes out of the stage by line 5. Under these conditions the lean gas leaving the first stage contains about 9.1% oxygen. No attempt is made to recover the residual oxygen in this gas, but the pressure energy of the outgoing gas is recovered by means of an expansion engine or used for combusting fuel to drive a gas turbine. Gas leaving the low pressure side of the membrane in the first stage under these conditions will have an oxygen content of about 32.6%. This rich gas mixture is recompressed to 8 atmospheres and led into the high pressure side of the second stage B. The rate of flow of the gas mixture on the high pressure side of stage B and on the high pressure side of each succeeding stage is adjusted so that the gas leaving the high pressure side of the stage will have the same composition as the gas entering the high pressure side of the last preceding stage. Thus, in stage B, the rate of flow on the high pressure side is adjusted so that the gas leaving the high pressure side of the stage has a composition of 20.9% oxygen and this gas is recycled to the high pressure side of stage A where it joins the ingoing air stream.

In the table below is given the percent of oxygen in the gas entering and leaving the high pressure side of each stage, the percent of oxygen in the gas leaving the low pressure side of each stage, and the fraction of the in-gas which permeates in each stage when the flow rates on the high pressure side of the membrane in each stage are adjusted as described above.

| Stage | Fraction of gas permeating | Percent $O_2$ in gas entering high pressure side | Percent $O_2$ in gas leaving high pressure side | Percent $O_2$ in gas leaving low pressure side |
|---|---|---|---|---|
| A | .502 | 20.9 | 9.1 | 32.6 |
| B | .388 | 32.6 | 20.9 | 51.1 |
| C | .515 | 51.1 | 32.6 | 68.5 |
| D | .554 | 68.5 | 51.1 | 82.5 |
| E | .621 | 82.5 | 68.5 | 91.1 |

It will be noted that after five stages of permeation a mixture containing about 91% oxygen is obtained.

Using a membrane of cellulose propionate under the same conditions as in the example above substantially the same results would be obtained. Using a rubber membrane, however, under the same conditions described in the example, in order to obtain a 91% oxygen gas at least seven permeation stages would have to be employed. Furthermore, with the use of a rubber membrane oxidative deterioration of the rubber would proceed rapidly requiring frequent stoppages of the process to replace the deteriorated membrane.

If desired, higher degrees of separation may be obtained in a single stage by increasing the rate of flow of the gas on the high pressure side of the membrane. For example, where the pressure on the high pressure side of the membrane is eight atmospheres and on the low pressure side is one atmosphere, as in the example above, a maximum enrichment of the air permeating in the first stage to a concentration of 42.6 percent oxygen could be obtained. This is more than double the concentration of oxygen (20.9%) in the air on the high pressure side of the membrane. Using a rubber membrane under these same conditions, the maximum enrichment obtainable would correspond to a concentration of oxygen in the permeated gas in the first stage of about 35.5%. As previously explained, however, it is not, in general, economical to operate with rates of flow high enough to obtain maximum separation in each stage.

Of the two types of membranes which have been found suitable for the process of the invention, ethyl cellulose is to be preferred. Both membranes have approximately the same selectivity to oxygen; ethyl cellulose, however, has a higher absolute permeability and thus requires less film area to separate a given volume of gas per unit time.

The process of the invention, involving selective permeation through non-porous membranes is of a physical-chemical nature in which the solubility of the gases in the membrane probably plays an important part. Knowing the chemical nature of a membrane, it is not possible to predict its usefulness in the process of the invention. Both high selectivity and fairly high permeability are required. Ethyl cellulose and cellulose propionate possess both these qualities to an admirable degree and the use of these membranes makes possible a commercially feasible process for obtaining oxygen-enriched gas mixtures from air operating on the principle of selective permeation.

The properties of membranes of the invention, including their selectivity and permeability, will vary to some extent according to the method in which they are manufactured. Thus, the degree of etherification or esterification respectively, the presence or absence of plasticisers, the type of solvent employed to prepare the film from which the membrane is made, the amount of stretch given the film during casting, and other factors may cause some variation in the characteristics of the membranes. Small amounts of other ether or ester groups such as the methoxy or acetate groups present in the ethyl cellulose and cellulose propionate membranes respectively will not alter the essential characteristics of the membrane for the purposes of use in the process of the invention. It is necessary, however, that the predominant chemical composition of the membrane be that of either ethyl cellulose or cellulose propionate.

The oxygen-enriched gas mixtures obtained according to the process of the present invention will have manifold uses such as in coal gasification processes or in blast furnace operations, or in any other process requiring oxygen-enriched gas mixtures.

It is to be understood that the above description and examples are for the purpose of illustrating the invention and it is not intended that the invention be limited thereby nor in any way except by the scope of the appended claims.

We claim:

1. A method for separating oxygen from air comprising the steps of bringing air into contact with one side of a thin, non-porous membrane comprised essentially of a plastic, film-forming material selected from the group consisting of ethyl cellulose and cellulose propionate, causing a portion of said air to permeate through said membrane, and removing oxygen-enriched air from the opposite side of said membrane.

2. A method for separating oxygen from air comprising the steps of bringing air maintained under a predetermined pressure into contact with one side of a thin, non-porous membrane comprised essentially of a plastic, film-forming material selected from the group consisting of ethyl cellulose and cellulose propionate, maintaining the opposite side of said membrane under a pressure lower than the pressure on said first-mentioned side, allowing a portion of said air to permeate through said membrane from the higher to the lower pressure side thereof, and removing oxygen-enriched air from said lower pressure side of said membrane.

3. A method for separating oxygen from air comprising the steps of bringing air at superatmospheric pressure into contact with one side of a thin, non-porous membrane comprised essentially of a plastic, film-forming material selected from the group consisting of ethyl cellulose and cellulose propionate, maintaining the opposite side of said membrane under a pressure lower than the pressure on said first-mentioned side, allowing a portion of said air to permeate through said membrane from the higher to the lower pressure side thereof, and removing oxygen-enriched air from said lower pressure side of said membrane.

4. A method for separating oxygen from air comprising the steps of bringing air into contact with one side of a thin, non-porous membrane comprised essentially of ethyl cellulose, causing a portion of said air to permeate through said membrane, and removing oxygen-enriched air from the opposite side of said membrane.

5. A method for separating oxygen from air comprising the steps of flowing an air stream maintained under a predetermined pressure into contact with one side of a thin, non-porous membrane comprised essentially of ethyl cellulose, maintaining the opposite side of said membrane under a pressure lower than the pressure of said first-mentioned side, allowing a portion of said air stream to permeate through said membrane from the higher to the lower pressure side thereof, and removing oxygen-enriched air from said lower pressure side of said membrane.

6. A method for separating oxygen from a gas mixture comprising oxygen and nitrogen, comprising the steps of bringing said gas mixture into contact with one side of a thin, non-porous membrane comprised essentially of a plastic, film-forming material selected from the group consisting of ethyl cellulose and cellulose propionate, causing a portion of said gas to permeate through said membrane, and removing an oxygen-enriched gas from the opposite side of said membrane.

7. A method for separating oxygen from a gas mixture comprising oxygen and nitrogen, comprising the steps of flowing said gas mixture at superatmospheric pressure into contact with one side of a thin, non-porous membrane comprised essentially of a plastic, film-forming material selected from the group consisting of ethyl cellulose and cellulose propionate, maintaining the opposite side of said membrane under a pressure lower than the pressure on said first-mentioned side, allowing a portion of said gas stream to permeate through said membrane from the higher to the lower pressure side thereof, and removing an oxygen-enriched gas from said lower pressure side of said membrane.

8. The process according to claim 7 in which the membrane is comprised essentially of ethyl cellulose.

9. A multi-stage process for the separation of oxygen from gas mixtures comprising oxygen and nitrogen involving the use of a plurality of permeation stages, wherein each stage comprises a high pressure side and a low pressure side, and wherein the high and low pressure side in each stage is separated by a thin, non-porous membrane comprised essentially of a plastic, film-forming material selected from the group consisting of ethyl cellulose and cellulose propionate, comprising the steps of compressing the original gas mixture and passing it to the high pressure side of a first permeation stage, removing an oxygen-enriched gas from the low pressure side of the first stage and each stage thereafter, separately compressing the oxygen-enriched gas removed from the low pressure side of each stage, separately passing the compressed oxygen-enriched gas from the low pressure side of each stage to the high pressure side of the next succeeding stage, while flowing the gas on the high pressure side of each stage in contact with said membrane at a rate selected to allow a predetermined portion of said gas to permeate through said membrane to the low pressure side thereof.

10. A multi-stage process for the separation of oxygen from gas mixtures comprising oxygen and nitrogen involving the use of a plurality of permeation stages, wherein each stage comprises a high pressure side and a low pressure side, and wherein the high and low pressure side in each stage is separated by a thin, non-porous membrane comprised essentially of a plastic, film-forming material selected from the group consisting of ethyl cellulose and cellulose propionate, comprising the steps of compressing the original gas mixture and passing it to the high pressure side of a first permeation stage, removing an oxygen-enriched gas from the low pressure side of the first stage and each stage thereafter, separately compressing the oxygen-enriched gas removed from the low pressure side of each stage, separately passing the compressed oxygen-enriched gas from the low pressure side of each stage to the high pressure side of the next succeeding stage, recycling a portion of the gas flowing on the high pressure side of each stage, except the first, to the high pressure side of the last preceding stage, while flowing the gas on the high pressure side of each stage in contact with said membrane at a rate selected to allow a predetermined portion of said gas to permeate through said membrane to the low pressure side thereof.

11. The process according to claim 9 in which the membrane is comprised essentially of ethyl cellulose.

12. The process according to claim 10 in which the membrane is comprised essentially of ethyl cellulose.

SOL W. WELLER.
WALDO A. STEINER.

REFERENCES CITED

The following references are of record in the file of this patent:

UNITED STATES PATENTS

| Number | Name | Date |
|---|---|---|
| 2,388,095 | Stahly | Oct. 30, 1945 |

FOREIGN PATENTS

| Number | Country | Date |
|---|---|---|
| 266,396 | Great Britain | Feb. 23, 1927 |

OTHER REFERENCES

Paper Trade Journal, No. 10, 32–35 (1944), Chem. Abst. 38, 1919$^4$.